(No Model.)
T. F. CALAHAN.
SHEARS.
No. 452,260. Patented May 12, 1891.
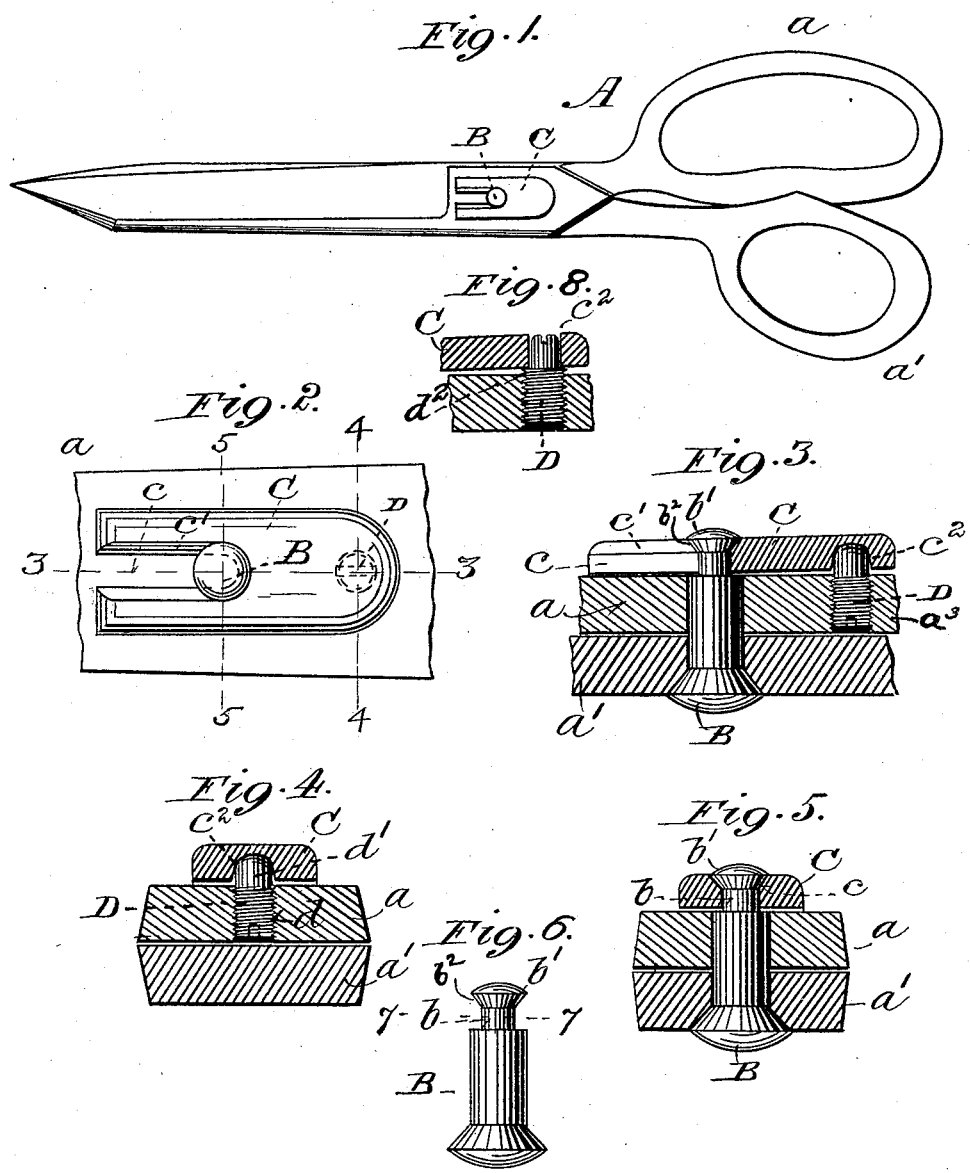

UNITED STATES PATENT OFFICE.

THOMAS F. CALAHAN, OF ST. LOUIS, MISSOURI.

SHEARS.

SPECIFICATION forming part of Letters Patent No. 452,260, dated May 12, 1891.

Application filed January 19, 1891. Serial No. 378,340. (No model.)

*To all whom it may concern:*

Be it known that I, THOMAS F. CALAHAN, of St. Louis, Missouri, have made a new and useful Improvement in Shears, of which the following is a full, clear, and exact description.

Appliances of various descriptions have heretofore been used upon shears for the purpose of maintaining the proper tension upon the blades. The present improvement has a similar purpose in view; and it consists in the means, substantially as is hereinafter described and claimed, aided by the annexed drawings, making part of this specification, in which—

Figure 1 is a plan of a pair of shears having the improvement; Fig. 2, a plan of that portion of the shears with which the improvement is immediately connected. Fig. 3 is a section on the line 3 3 of Fig. 2; Fig. 4, a cross-section on the line 4 4 of Fig. 2; Fig. 5, a cross-section on the line 5 5 of Fig. 2; Fig. 6, a side elevation of the rivet; Fig. 7, a cross-section on the line 7 7 of Fig. 6; and Fig. 8, a section analogous to that of Fig. 3, showing a modified construction. The last seven views are upon an enlarged scale.

The same letters of reference denote the same parts.

The shears or scissors A, as the improvement can be applied to either, are of the usual construction, saving as it may be modified or supplemented by the improvement under consideration.

B represents the rivet which unites the two parts $a$ and $a'$ of the shears and upon which they turn in their operation.

C represents a tension-plate. It is preferably of springy material, such as steel, and it is applied to one—say the part $a$—of the shear parts, and in such a way, and to this end it is suitably constructed, as to hold the rivet endwise in place, and also so that it can be adjusted from time to time to draw upon the rivet, and thereby maintain the proper tension of the scissor-blades upon each other.

The improvement has reference particularly to the tension-plate and the parts immediately therewith coacting, and their construction and operation will now be described. The tension-plate is extended longitudinally upon the shear part both ways past the position of the rivet, substantially as shown, and is slotted, substantially as shown, at $c$ to enable the tension-plate to engage with the rivet. The slot extends, preferably longitudinally, in the tension-plate from an end thereof inward to the position of the rivet. The slot might be otherwise extended into and shaped in the tension-plate to reach the position of the rivet therein to enable the tension-plate to engage with the rivet.

D represents a part whose function it is to press one of the ends of the tension-plate away from the shear part to which the tension-plate is applied and in such action to draw the rivet with it, and thereby tighten the shear parts $a$ $a'$ together. To this end the part in question is made in the form, preferably, of a thrust-screw, and is held and adapted to be screwed into and out of a threaded perforation $d$ in the shear $a$, and having a projecting end $d'$, which in the operation of the part engages in a recess $c^2$ in the tension-plate and bears against the inner end or some other shoulder in or about said recess.

The parts are assembled as follows: The shear parts being united by means of the rivet, the tension-plate is applied to the rivet, as described, and then the thrust-screw is inserted from the inner side $a^3$ of the shear part $a$, and is worked through the perforation $d$ to cause its end $d'$ to engage in the recess $c^2$, and by continuing to work the thrust-screw in the same direction that end of the tension-plate against which the thrust-screw is acting is moved away from the shear part $a$. This causes the opposite end of the tension-plate to bear upon the shear part $a$, and the tension-plate in consequence acts as a lever to draw the rivet B, and the shear parts are tightened as desired, and whenever they require further tightening it is only necessary to work the thrust-screw still farther in the direction described.

To insert the thrust-screw in place the shear parts require to be opened widely apart in order to uncover the perforation $d$. It results from this that the inlet to said perforation is usually guarded by the other $a'$ of the shear parts, and the thrust-screw is not likely to work loose from the shear part $a$.

A modification of the construction in the respect under consideration is exhibited in Fig. 8, in which view the recess $c^2$ is exhibited entirely through the tension-plate, and the thrust-screw is constructed to be operated from the outer side of the tension-plate, as well as from the inner side of the shear part $a$; but in either case the thrust-screw is constructed to bear against the tension-plate in or about said recess $c^2$ to enable the thrust-screw to act upon the tension-plate in the manner described. This is accomplished in the modification referred to by making the outer end of the thrust-screw smaller, and thereby providing a shoulder $d^2$ upon the thrust-bolt which encounters the tension-plate, substantially as shown.

An additional feature of the improvement is the special shape of that part of the rivet which engages with the tension-plate. In place of simply notching the rivet upon one side or upon opposite sides thereof, the rivet is grooved all around, substantially as shown at $b$, and forming a head $b'$ at the outer end of the rivet. An important advantage accrues from this construction. The three parts—namely, the two shear parts $a$ and $a'$ and the rivet—are all free to work in and upon each other—that is, the rivet is not confined in any one of said parts, but so that it can work and wear evenly in all of them.

Another feature of the rivet and tension-plate in combination is the bevel $b^2$ upon the under side of the rivet-head and the coacting bevel $c'$ on the wall of the slot $c$. As the tension-plate is tightened, and thereby slightly inclined, it acts upon the rivet to better advantage than if the rivet-head were formed by means of a square offset with a corresponding construction in the tension-plate.

It will be noted that the tension-plate is kept from turning around by reason of its being engaged at two points where the rivet, and also where the thrust-screw, engages with it.

I claim—

1. The combination of the shear parts, the rivet having the head $b'$, the slotted tension-plate having the recess $c^2$, and the thrust-screw D, substantially as described.

2. In shears having a tension-plate, the thrust-screw D, working from the inner side of the shear part and projecting outward therefrom to bear against said tension-plate, for the purpose described.

Witness my hand this 7th day of January, 1891.

THOMAS F. CALAHAN.

Witnesses:
C. D. MOODY,
A. BONVILLE.